United States Patent
Takizawa

[19]

[11] Patent Number: 6,152,266
[45] Date of Patent: Nov. 28, 2000

[54] BRAKING POWER MODULATOR FOR A BICYCLE

[75] Inventor: Shinichi Takizawa, Osaka, Japan

[73] Assignee: Shimano Inc., Osaka, Japan

[21] Appl. No.: 09/335,533

[22] Filed: Jun. 18, 1999

[30] Foreign Application Priority Data

Mar. 5, 1999 [TW] Taiwan ................................ 88103409

[51] Int. Cl.$^7$ ...................................................... B62L 3/02
[52] U.S. Cl. ........................ 188/24.21; 74/502.2; 188/20; 188/24.18
[58] Field of Search .............................. 188/24.11, 24.12, 188/24.15, 24.18, 24.22, 2 D, 24.21; 74/502.2, 502.4, 502.6

[56] References Cited

U.S. PATENT DOCUMENTS

| | | | |
|---|---|---|---|
| 4,351,418 | 9/1982 | Woodring et al. | 188/24.22 |
| 4,793,444 | 12/1988 | Nagano | 188/24.12 |
| 4,823,915 | 4/1989 | Nagano | 188/2 D |
| 5,261,293 | 11/1993 | Kelley | 74/502.6 |
| 5,566,789 | 10/1996 | Allen | 188/24.15 |
| 5,613,405 | 3/1997 | Kelley et al. | 74/502.4 |

FOREIGN PATENT DOCUMENTS

| | | |
|---|---|---|
| 454438 | 7/1913 | France . |
| 811574 | 4/1937 | France . |
| 29822420 | 4/1999 | Germany . |
| 53-101655 | 8/1978 | Japan . |
| 1165834 | 11/1989 | Japan . |
| 9118286 | 5/1997 | Japan . |
| 331806 | 11/1998 | Taiwan . |
| 675550 | 12/1952 | United Kingdom . |

OTHER PUBLICATIONS

SOS®; Anti Lock Brake System; Three pages illustrating a product sold prior to Jun. 1999 in Japan.

Tektro's;Power Modulator—Photographs of the product and a sketch; Sold prior to Jun. 1999.

*Primary Examiner*—Matthew C. Graham
*Assistant Examiner*—Melody M. Burch
*Attorney, Agent, or Firm*—Shinjyu Global IP Counselors, LLP

[57] ABSTRACT

A braking power modulator is provided for a bicycle brake to modulate a braking power corresponding to a stroke of an inner wire of the brake cable. The braking power modulator is mounted midway along a brake cable for the bicycle brake. The braking power modulator is adjustable to provide different braking powers for different riders or different road conditions. The braking power modulator basically includes a tubular portion, a first blocking portion, a second blocking portion, a biasing member and an adjusting member. The tubular portion has a first end and a second end with a longitudinal axis extending therebetween. The first blocking portion for axial movement within the tubular portion along a predetermined modulator stroke has a first cable bore and is coupled to the first end of the tubular portion. The second blocking portion has a second cable bore and is movably coupled to the second end of the tubular portion. The biasing member is disposed in the tubular casing between the first and second blocking portions under a pre-loaded state with a pre-set compression force. The adjusting member engages the biasing member to change the pre-set compression force of the biasing member without changing the predetermined modulator stroke of the first blocking portion.

31 Claims, 12 Drawing Sheets

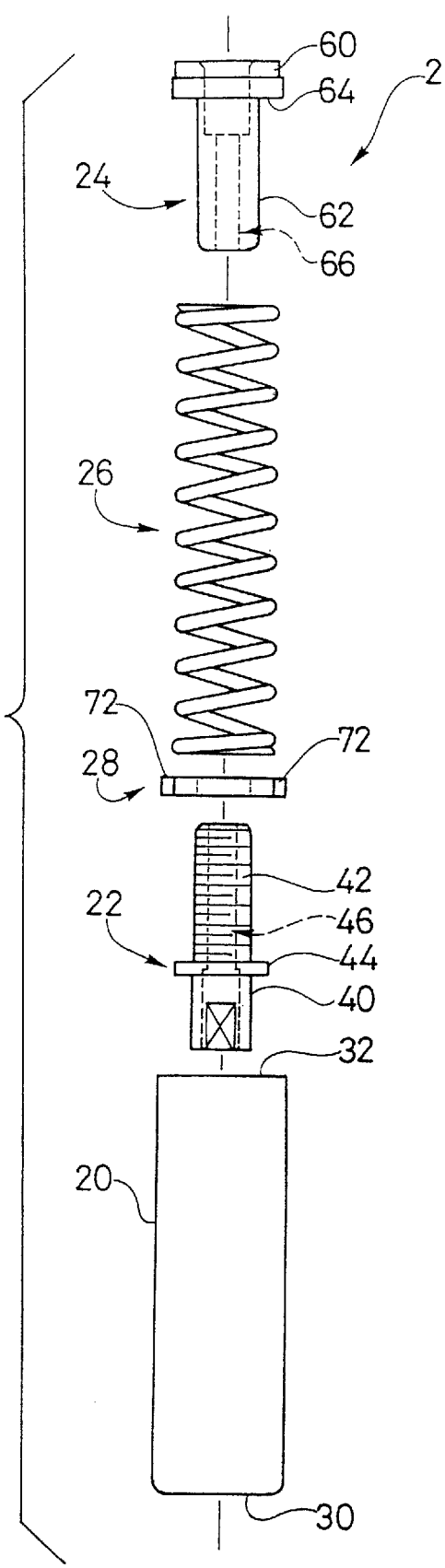
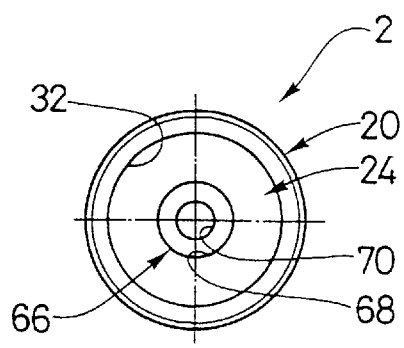
FIG. 4
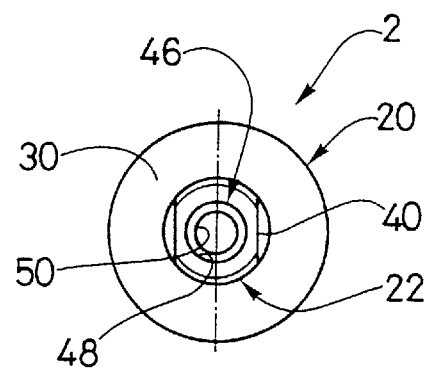
FIG. 5
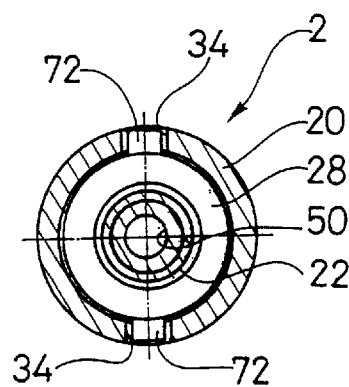
FIG. 6

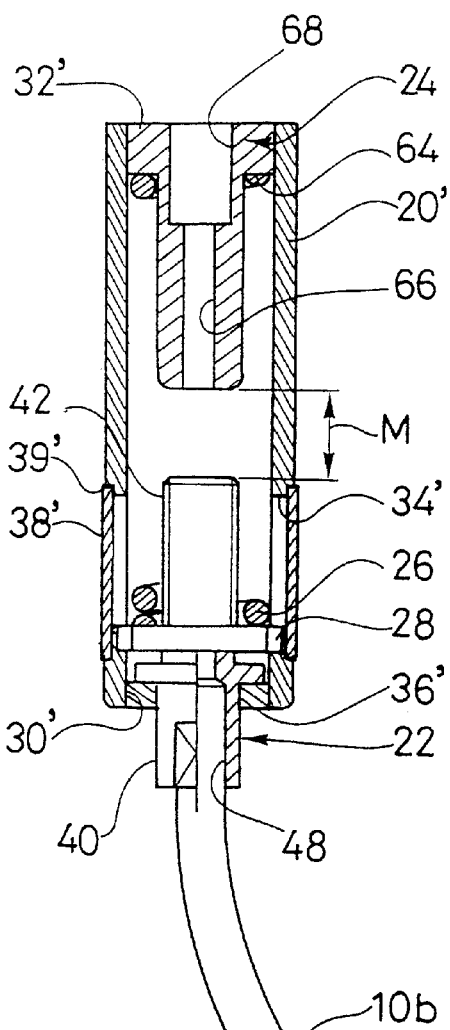
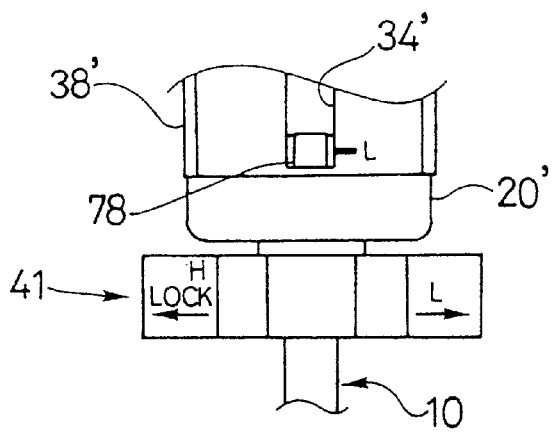
FIG. 12
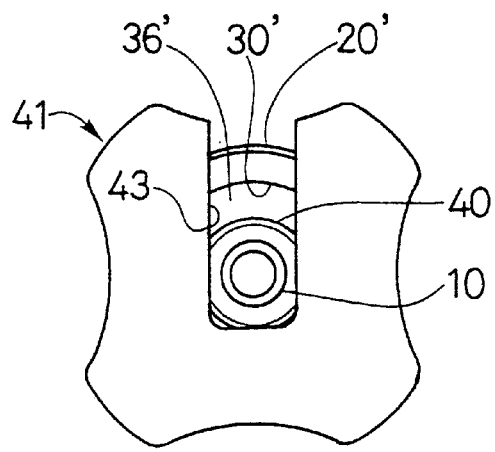
FIG. 13
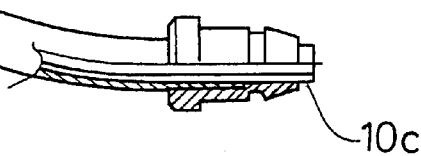
FIG. 11

BRAKING POWER MODULATOR FOR A BICYCLE

BACKGROUND OF THE INVENTION

1. Field of the Invention

This invention generally relates to a braking power modulator for a bicycle brake device. More specifically, the present invention relates to an adjustable braking power modulator, which can be mounted midway along a brake cable of a bicycle brake device to modulate a braking power corresponding to a stroke of an inner wire of the brake cable. The adjustable braking power modulator provides different braking powers to meet the needs of different riders or different road conditions.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle as well as the frame of the bicycle. One component that has been extensively redesigned is the bicycle brake. The bicycle brake has been redesigned to provide the rider with increased braking power. This increased braking power may be difficult for the inexperienced rider to control. Specifically, a bicycle brake with a very large braking power can possibly cause the bicycle wheel to lock up. This may cause the bicycle to skid.

In order to assist inexperienced riders in operating a bicycle brake, a braking power modulating device can be added to the brake cable between the brake lever and the bicycle brake device. An example of a braking power modulator has been proposed in Taiwanese Patent Publication No. 335378, which published on Jul. 1, 1998. In addition, other solutions have been proposed, such as that disclosed in Taiwanese Patent Publication No. 351315, titled "Brake Cable Structure with Buffering Effect", published on Jan. 21, 1999.

The bicycle braking power modulating device disclosed in the aforementioned Taiwanese Patent Publication No. 335378 is effective in changing the braking power to prevent the overly early lock of the rim by the brake shoes. However, the braking power modulating device has such a construction that braking power modulating device must be integrally mounted on one of two brake arms of the brake device, the structure of the brake arm becomes complicated. Therefore, the manufacturing cost and the price of the device are quite high, which is disadvantageous in terms of generalizing the use thereof.

In the brake cable structure with a buffering effect disclosed in the aforementioned Taiwanese Patent Publication No. 351315, a guiding housing is fixed to a brake arm or a brake lever and has a chamber with a predetermined depth for receiving a buffering block made of an elastomer and an end of an outer casing of a brake cable. The buffering block has a central through hole for passing an inner wire of the brake cable. During the braking operation, the outer casing of the brake cable is compressed to thereby compress the buffering block so that a resistance is produced by the buffering block. Thus, a longer response time and hence a buffering effect are produced when the brake lever is actuated for braking operation. In this case, however, since the guiding housing for receiving the buffering block is provided as a portion of the brake cable, when this type of brake cable structure is used, it is necessary to use an entire set of the brake cable structure rather than only a part thereof. Hence, the general applicability of this brake cable structure is poor and the manufacturing cost and the price thereof are relatively high, which is disadvantageous in terms of generalizing the use thereof.

In view of the above, there exists a need for a braking power modulator for a bicycle which can be easily adapted for various types of brake device and which is highly reliable and inexpensive. This invention addresses these needs in the art, along with other needs, which will become apparent to those skilled in the art once given this disclosure.

SUMMARY OF THE INVENTION

One object of the present invention is to provide for a braking power modulator for a bicycle, which is adjustable to provide different braking powers for different riders or different road conditions.

Another object of the present invention is to provide a braking power modulator for a bicycle that is highly reliable.

Still another object of the present invention is to provide a braking power modulator for a bicycle, in which adjustment of a pre-set compression force of a biasing member does not change the predetermined modulator stroke.

Yet another object of the present invention is to provide a braking power modulator for a bicycle, which is adjustable to change the braking power relative to the brake cable stroke.

A further object of the present invention is to provide a braking power modulator for a bicycle that is relatively inexpensive to manufacture.

The foregoing objects of the present invention can be attained by providing a braking power modulator for a bicycle. The braking power modulator is mounted midway along a brake cable for the bicycle brake. The braking power modulator basically includes a tubular portion, a first blocking portion, a second blocking portion, a biasing member and an adjusting member. The tubular portion has a first end and a second end with a longitudinal axis extending therebetween. The first blocking portion has a first cable bore and is movably coupled to the first end of the tubular portion for axial movement within the tubular portion along a predetermined modulator stroke. The second blocking portion has a second cable bore and is coupled to the second end of the tubular portion. The biasing member is disposed in the tubular portion between the first and second blocking portions under a pre-loaded state with a pre-set compression force. The adjusting member engages the biasing member to change the pre-set compression force of the biasing member without changing the predetermined modulator stroke of the first blocking portion.

A braking power modulator for a bicycle brake constituted as above can be mounted midway along a brake cable of any type of brake device as desired. When a rider operates a brake lever to pull an inner wire of the brake cable for braking operation, it is necessary for the rider to exert a force greater than a pre-loaded force applied to a coil spring disposed in a housing of the modulator in order to cause brake arms to be moved by the inner wire of the brake cable so that a rim of a bicycle wheel is clamped by brake shoes to achieve a braking action.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 3 is an exploded front elevational view of the braking power modulator illustrated in FIGS. 1 and 2 in accordance with the present invention;

FIG. 4 is a top plan view of the braking power modulator illustrated in FIGS. 1–3 in accordance with the present invention;

FIG. 5 is a bottom plan view of the braking power modulator illustrated in FIGS. 1–4 in accordance with the present invention;

FIG. 6 is a transverse cross-sectional view of the braking power modulator illustrated in FIGS. 1–5 as seen along section line 6—6 of FIG. 2;

FIG. 11 is a longitudinal cross-sectional view of the tubular casing portion of the braking power modulator illustrated in FIG. 10 with selected components shown in elevation;

FIG. 12 is an enlarged, partial front elevational view of the braking power modulator illustrated in FIG. 10 with a hand operated adjuster coupled thereto in accordance with the present invention;

FIG. 13 is a bottom plan view of the braking power modulator and hand operated adjuster illustrated in FIGS. 12 in accordance with the present invention;

DETAILED DESCRIPTION OF THE PREFERRED EMBODIMENTS

Figure 1:
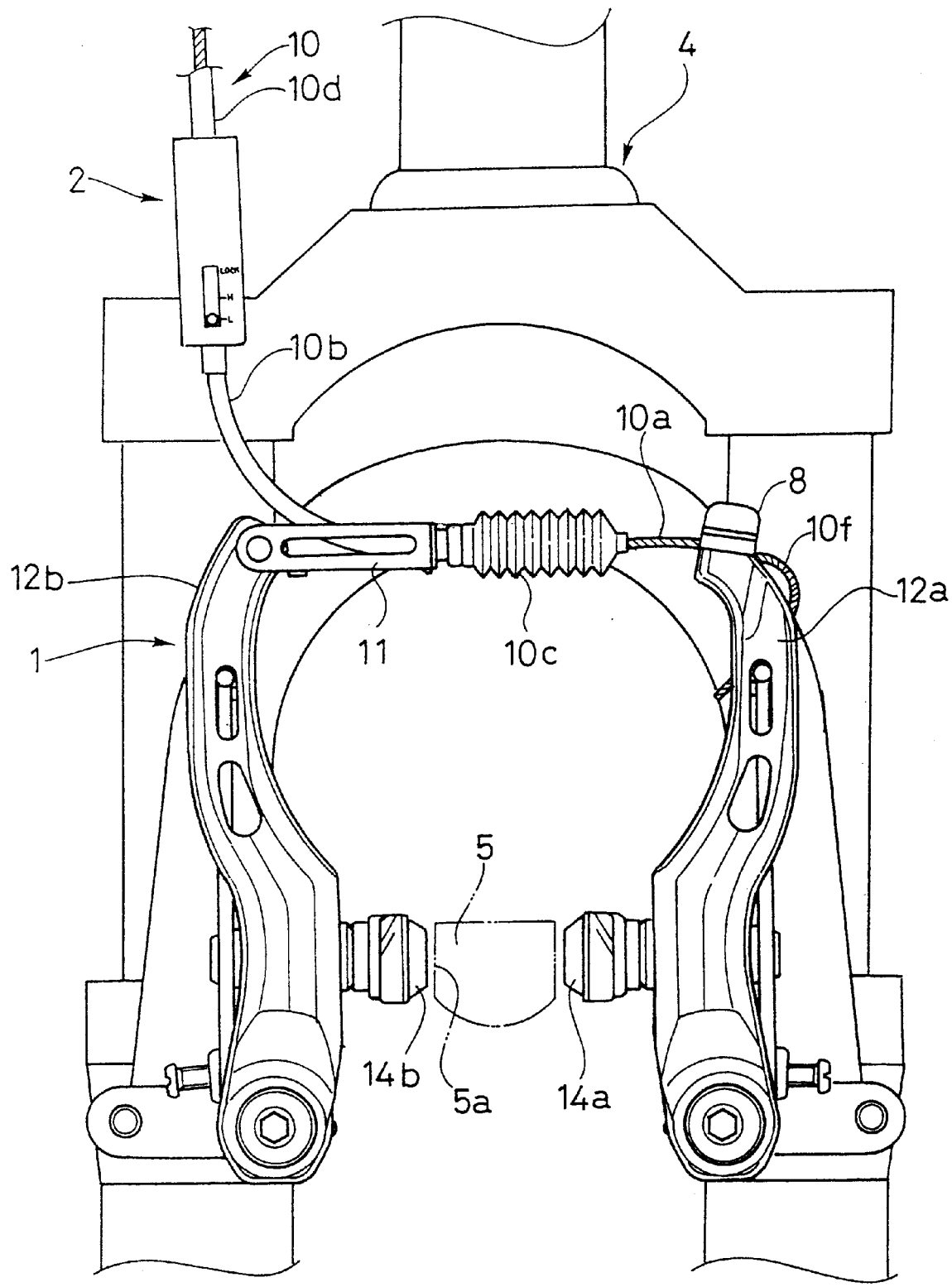
FIG. 1 is a front elevational view of a bicycle brake device having a braking power modulator in accordance with the present invention coupled midway along the brake cable.
Figure 2:
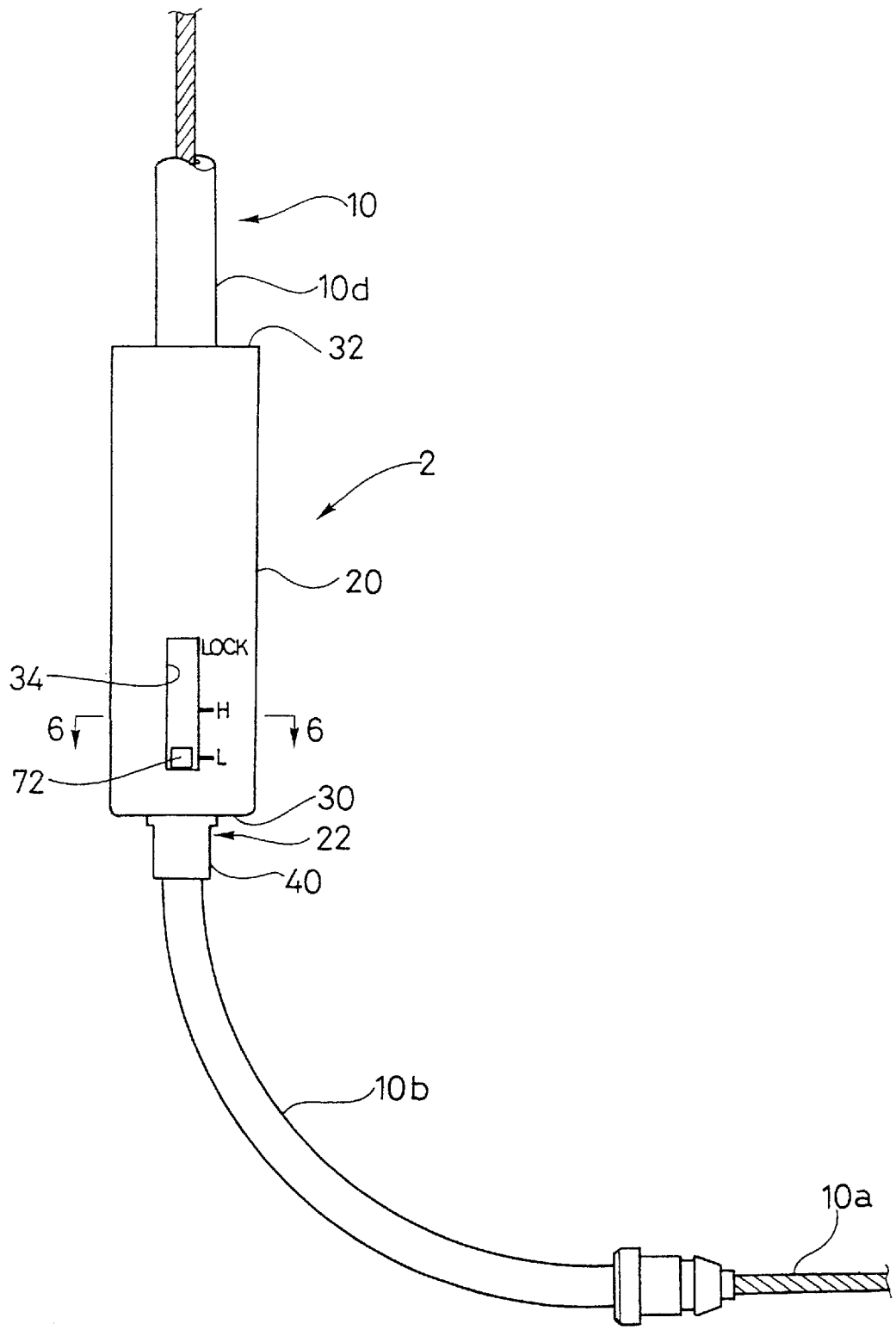
FIG. 2 is an enlarged front elevational view of the braking power modulator illustrated in FIG. 1 in accordance with the present invention.

Referring initially to FIG. 1, a bicycle brake device 1 is illustrated with a braking power modulator 2 mounted mid-way along its brake cable 10 according to the present invention. The braking power modulator 2 is provided for the bicycle brake device 1 to modulate a braking power corresponding to a stroke of an inner wire 10a of the brake cable 10. In this preferred embodiment, the braking power modulator 2 is adjustable to vary the application of the braking power of brake device 1. The braking power modulator 2 has a constant overall stroke regardless of the setting of the braking power modulator 2. Moreover, the length of the modulator stroke of braking power modulator 2 does not vary when the settings are changed.

The bicycle brake device 1 shown in FIG. 1 is a cantilever type of a brake device that is mounted on the front fork 4 of a bicycle frame in a conventional manner. The bicycle brake device 1 achieves a braking effect by brake cable 10 pulling the upper ends of brake arms 12a and 12b together, which in turn presses brake shoes 14a and 14b against side surfaces 5a of a rim 5 of a bicycle wheel. Of course, it will be apparent to those skilled in the art that braking power modulator 2 can be used with other types of brake devices.

Brake arms 12a and 12b of the brake device 1 are pivotally supported on a front fork 4 of a bicycle frame. The brake arm 12a of the brake device 1 is connected at an upper end thereof with a front end 10f of an inner wire 10a of a brake cable 10 through a screw 8. The rear end of the inner wire 10a is connected to a brake lever (not shown) provided on a handlebar (not shown) in a conventional manner. The brake arm 12b of the brake device 1 is provided at an upper end thereof with a connecting arm 11, which is pivotable about the upper end of the brake arm 12b. A guiding tube 10b, or first outer casing for the inner wire 10a of the brake cable 10 is retained at a front end thereof in the connecting arm 11. A telescopic protecting sheath 10c is mounted around the inner wire 10a and disposed adjacent to the connecting arm 11.

Figure 8:
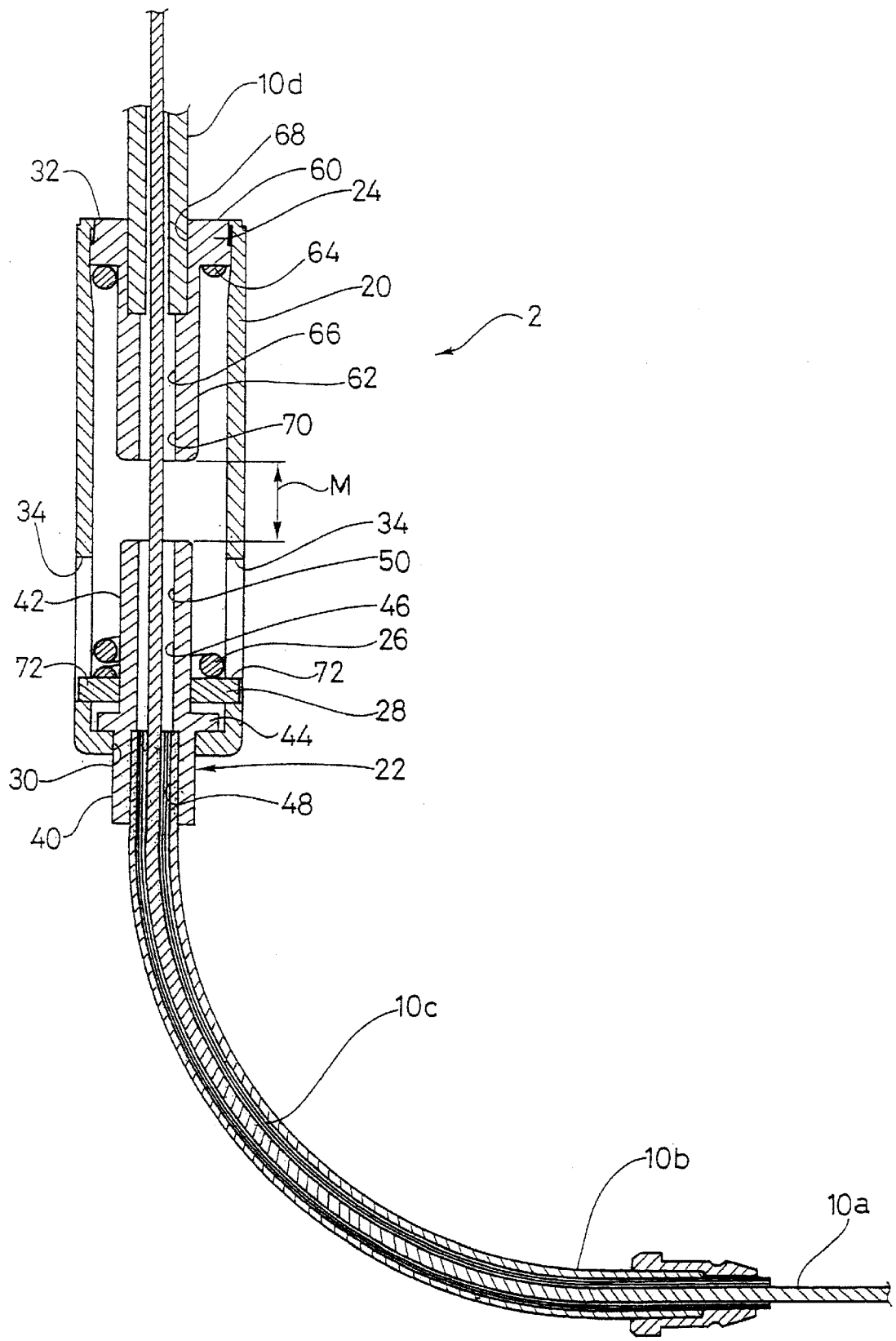
FIG. 8 is a longitudinal cross-sectional view of the braking power modulator illustrated in FIGS. 1–7 in accordance with the present invention.

As shown in FIG. 8, a rear end of the inner wire guiding tube 10b is inserted into one end of the braking power modulator 2 of the present invention. One end of the second outer casing 10d of the brake cable 10 is inserted into the upper end of the braking power modulator 2, while the other end of the outer casing 10d of the brake cable 10 is connected to the brake lever (not shown). Brake cables, such as the brake cable 10 used with the brake device 1, are currently available on the market without the braking power modulator 2. Brake cable 10 basically comprises the inner wire 10a, the inner wire guiding tube 10b, the telescopic protecting sheath 10c and the outer casing 10d. The inner wire 10a is preferably made of thin steel wires. The inner wire guiding tube 10b is preferably made of metal, such as aluminum, and has a plastic liner 10e as seen in FIG. 8. The telescopic protecting sheath 10c is preferably made of rubber. The outer casing 10d preferably has an inner layer made of metal and an outer layer made of resin.

In order to use the braking power modulator 2 of the present invention, it is only necessary to mount the braking power modulator 2 between the lower end of the outer casing 10d of the brake cable 10 and the inner wire guiding tube 10b. In particular, the lower end of the outer casing 10d is inserted into one end of the braking power modulator 2, and the upper end of the inner wire guiding tube 10b is inserted into the other end of the modulator 2. The rear end (not shown) of the inner wire 10a is fixed to an inner wire end mounting portion of the brake lever (not shown). The front end 10f of the inner wire 10a is sequentially passed through the outer casing 10d, the braking power modulator 2, the inner wire guiding tube 10b and the telescopic protecting sheath 10c. The front end 10f of the inner wire 10a is then fixed to the upper end of the brake arm 12a through the screw 8.

As shown in FIGS. 1, 2, 7 and 8, the braking power modulator 2 is mounted midway along a brake cable 10 for the bicycle brake device 1. The braking power modulator 2 is adjustable to provide different braking powers for different riders or different road conditions. Once the shoe clearance is fixed, the overall cable stroke for the brake device 1 is also fixed regardless of the setting of the braking power modulator 2.

Figure 7:
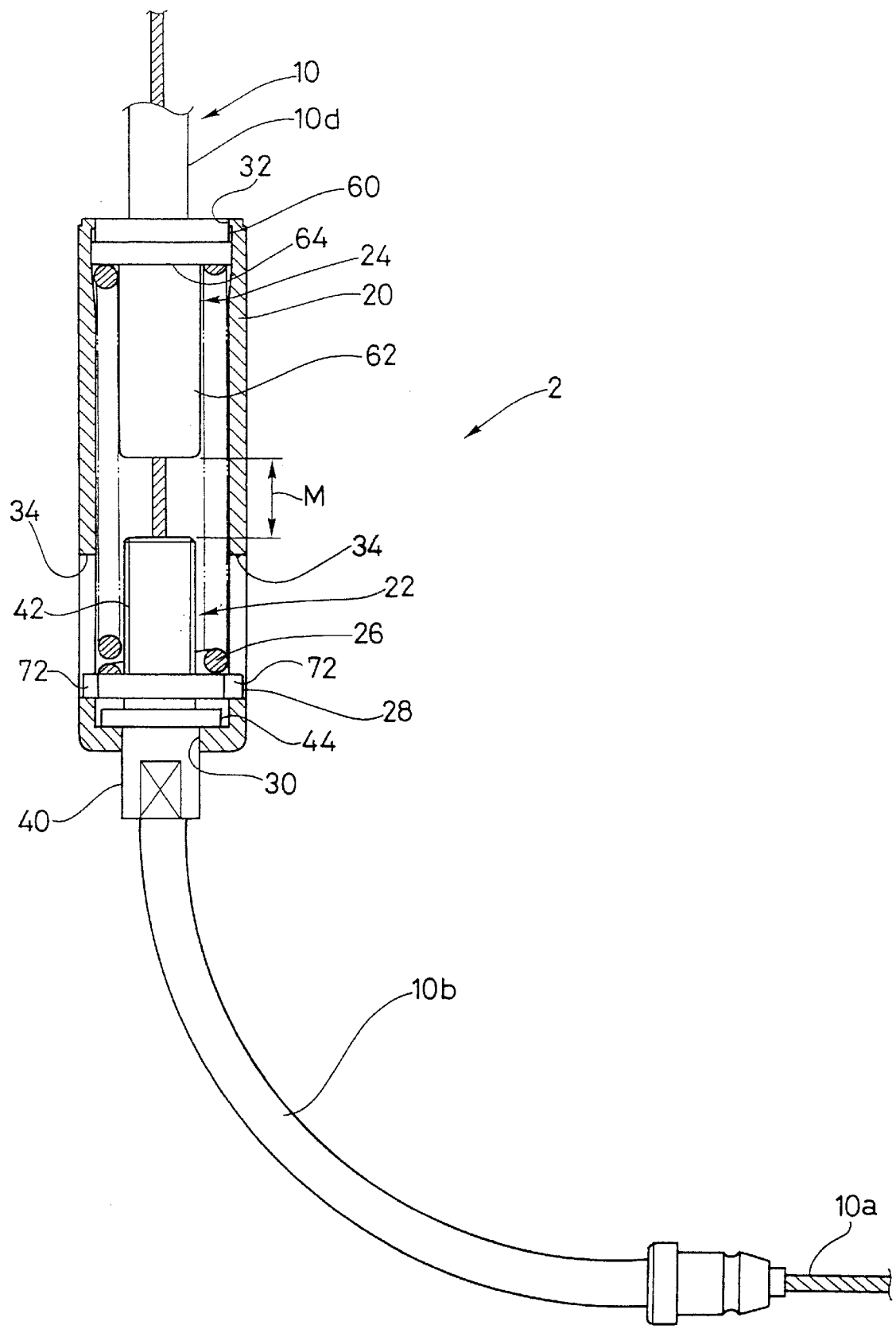
FIG. 7 is a longitudinal cross-sectional view of the tubular casing portion of the braking power modulator illustrated in FIGS. 1–6 with the internal components shown in elevation.
Figure 9:
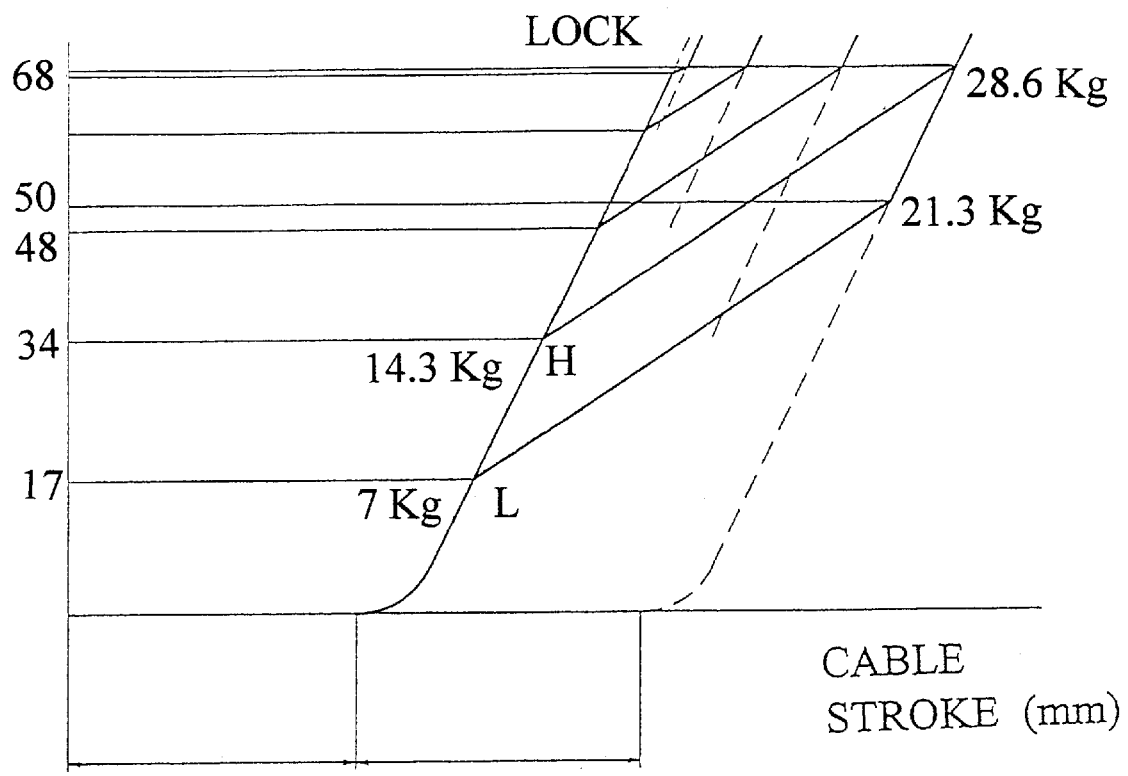
FIG. 9 is a graph of braking power curves representing a relationship between a braking force and a retraction stroke of the inner wire of the brake cable.

As shown in FIGS. 3, 7 and 8, the braking power modulator 2 basically includes an outer tubular casing or portion 20, a first blocking member or portion 22, a second blocking member or portion 24, a biasing member 26 and an adjusting nut or member 28. Braking power modulator 2 is designed so that the overall cable stroke does not change when the braking power modulator 2 is adjusted. This is accomplished by providing a constant modulator stroke M between the first and second blocking members 22 and 24, as seen in FIGS. 7 and 8. Preferably, modulator stroke M is approximately seven millimeters of the overall cable stroke. By adjusting braking power modulator 2, the modulator stroke M is shifted along the braking power curve as seen in FIG. 9.

FIGS. 7 and 8 are longitudinal sectional views showing the detailed structure of the braking power modulator 2 of the present invention. As best seen in FIGS. 7 and 8, the tubular casing 20 has a first open end 30 (FIG. 5) and a second open end 32 (FIG. 4) with a longitudinal axis extending therebetween. In the preferred embodiment, tubular casing 20 is a hollow cylindrical body made of aluminum or hard resin. The first blocking member 22 with the adjusting member 28 coupled thereto is movably disposed within outer tubular casing 20 adjacent the first open end 30. The second blocking member 24 is fixedly disposed within outer tubular casing 20 adjacent the second open end 32. The biasing member 26 is movably disposed within outer tubular casing 20 between the second blocking member 24 and the adjusting nut or member 28. In order to have a smooth movement of the first blocking member 22 and a smooth expansion and compression of the biasing member 26 in the casing 20, the interior of the casing 20 is preferably coated with a lubricating oil (not shown).

The side wall of tubular casing 20 is provided with a pair of elongated windows or openings 34 for viewing the setting of braking power modulator 2. Indicia can be provided on the side wall of tubular casing 20 to indicate the setting of braking power modulator 2. In the illustrated embodiment, three settings are provided on tubular casing 20, e.g., L (low) and H (high) and LOCK. Of course, other types of indicia can be used, such as a scale with kilograms.

The first blocking member 22 is in the form of a preloaded adjusting bolt that is adjustably coupled to the adjusting nut or member 28. The first blocking member 22 is movably mounted within the tubular casing 20 for axial movement within the tubular casing 20 along a predetermined modulator stroke. The biasing member 26 urges the first blocking member 22 towards the first open end 30 of the tubular casing 20. Thus, first blocking member 22 moves axially within the tubular casing 20 against the force of the biasing member 26. The force of the biasing member 26 on the first blocking member 22 (preloaded adjusting bolt) is varied by changing the relative position of the adjusting nut or member 28 along the first blocking member 22. The first blocking member 22 is a hollow cylindrical body that is preferably made of a hard resin material or aluminum. The first blocking member 22 has a first section 40 protruding out of the first open end 30 of the tubular casing 20, a second section 42 located within the tubular casing 20 and an annular abutment flange 44.

The annular abutment flange 44 has an outer diameter slightly smaller than an inner diameter of the casing 20 and greater than an inner diameter of the opening of first open end 30 of the casing 20. The first blocking member 22 is movably disposed adjacent to the first open end 30 within the casing 20. Thus first blocking member 22 is prevented from falling out of the casing 20 from the first open end 30 due to the fact that the outer diameter of the annular abutment flange 44 is greater than the inner diameter of the first opening the of open end 30.

As shown in FIG. 8, a first cable bore 46 extends axially through the first and second sections 40 and 42 for receiving portions of the brake cable 10 therethrough. More specifically, first cable bore 46 of the first blocking member 22 is step shaped and has a first cylindrical portion 48 and a second cylindrical portion 50. The first cylindrical portion 48 extends along first section 40 of first blocking member 22, and has a diameter slightly greater than an outer diameter of the inner wire guiding tube 10b of the brake cable 10. The second cylindrical portion 50 extends along second section 42 of first blocking member 22, and has a diameter slightly greater than an outer diameter of the inner wire 10a of the brake cable 10. An abutment is formed between the first and second cylindrical portions 48 and 50 of the first cable bore 46 of first blocking member 22 for abutting an end of the inner wire guiding tube 10b of the brake cable 10.

The first section 40 of the first blocking member 22 protrudes out of the opening in the first end 30 of the tubular casing 20. The first section 40 of the first blocking member 22 has a pair of parallel flat surfaces so that the first blocking member 22 can be rotated about its longitudinal axis. The second section 42 of the first blocking member 22 has external threads for threadedly coupling the adjusting member or nut 28 thereto. The biasing member 26 engages the adjusting member or nut 28 to urge the first blocking member 22 towards the first open end 30 of the tubular casing 20. Thus, the annular abutment flange 44 of the first blocking member 22 contacts the end wall of the first open end 30 of the tubular casing 20. The force of the biasing member 26 on the first blocking member 22 (bolt preloaded adjusting) is varied by changing the relative position of the adjusting nut or member 28 along the first blocking member 22, as discussed below.

The second blocking member 24 is in the form of a preloaded cap that is fixedly coupled to the second open end 32 of the tubular casing 20. Preferably, the second blocking member 24 is press-fitted into the second open end 32 of the tubular casing 20. Alternatively, the second blocking member 24 is adhesively coupled within the second open end 32 of the tubular casing 20. Similar to the first blocking member 22, the second blocking member 24 is a hollow cylindrical body made of a hard resin material or aluminum. One end of the biasing member 26 engages the second blocking member 24, while the other end of the biasing member 26 engages the adjusting nut or member 28 to normally hold the first blocking member 22 against the end wall of first open end 30.

As shown in FIG. 8, the second blocking member 24 has a first section 60 and a second section 62, with an abutment surface 64 formed by the axially facing surface located between the first and second sections 60 and 62. The abutment surface 64 engages one end of the biasing member 26. The second blocking member 24 also has a second axially extending cable bore 66. This second cable bore 66 of second blocking member 24 has a first cylindrical portion 68 and a second cylindrical portion 70. The first cylindrical portion 68 of second blocking member 24 has a diameter slightly greater than an outer diameter of the outer casing 10d of the brake cable 10. The second cylindrical portion 70 of second blocking member 24 has a diameter slightly greater than an outer diameter of the inner wire 10a of the brake cable 10. An abutment is formed between the first and second cylindrical portions 68 and 70 of the second cable bore 66 of the second blocking member 24 for abutting an end of the outer casing member 10d of the brake cable 10.

The biasing member 26 is preferably a coil spring that is disposed in the tubular casing 20 between the first and second blocking members 22 and 24 under a pre-loaded state with a pre-set compression force. The coil spring 26 is preferably made of steel. The coil spring 26 has an outer diameter slightly smaller than the inner diameter of the tubular casing 20. The an inner diameter of coil spring 26 is equal to or slightly greater than an outer diameter of the second cylindrical section 42 of the first blocking member 22 and an outer diameter of the second cylindrical section 62 of the second blocking member 24. The coil spring 26 is disposed in the casing 20 with one end portion surrounding the second cylindrical section 42 of the first blocking member 22 and the other end portion surrounding the second cylindrical section 62 of the second blocking member 24. One end of the biasing member 26 engages the abutment surface 64 of the second blocking member 24. The other end of the biasing member 26 engages the adjusting nut or member 28 to normally hold the first blocking member 22 against the end wall of first open end 30.

The adjusting member or nut 28 is located within the tubular casing 20 and is adjustably coupled along the length of the second section 42 of the first blocking member 22. The adjusting member or nut 28 has a pair of tabs 72 extending outwardly in opposite directions, i.e., 180° apart. The tabs 72 are slidably received within the windows or elongated openings 34. The tabs 72 serve two functions. First, tabs 72 prevent adjusting member or nut 28 from rotating within the tubular casing 20. Second, tabs 72 act as indicating members to display the amount of compression of the biasing member 26. In other words, the setting of braking power modulator 2 is determined by the location of tabs 72 within the windows or elongated openings 34. As mentioned above, indicia is preferably applied to the side wall of tubular casing 20 to indicate the setting of braking power modulator 2. In the illustrated embodiment, three settings are provided on tubular casing 20, e.g., L (low) and H (high) and LOCK.

The adjusting member or nut 28 engages the biasing member 26 to change the pre-set compression force of the biasing member 26 without changing the predetermined modulator stroke of the second blocking member 24. Specifically, the adjusting member or nut 28 has a threaded bore that threadedly engages the external threads of the second section 42 of the first blocking member 22 for threadedly coupling the adjusting member or nut 28 thereto. Thus, rotating the first blocking member 22 causes the adjusting member or nut 28 to move axially within in the tubular casing 20. As the adjusting member or nut 28 moves towards the second blocking member 24, the biasing member or coil spring 26 is compressed. In other words, the force of the biasing member 26 on the first blocking member 22 (bolt preloaded adjusting) is varied by changing the relative position of the adjusting nut or member 28 along the first blocking member 22. During this movement of the adjusting member or nut 28 and the compression of the biasing member or coil spring 26, the first and second blocking members 22 and 24 remain stationary. In other words, the relative positions of the first and second blocking members 22 and 24 do not change during compression of the biasing member or coil spring 26. Accordingly the modulator stroke remains constant for each setting of braking power modulator 2.

One possible way of assembling the braking power modulator 2 will now be described. First, the adjusting member or nut 28 is inserted into the tubular casing 20 through one of the open ends 30 or 32. The tabs 72 of the adjusting member or nut 28 are positioned in the windows or openings 34 of the tubular casing 20. The first blocking member 22 is then inserted into the tubular casing 20 through the first open end 30 of the tubular casing 20 and threaded into the adjusting member or nut 28. Now, the first open end 30 of the tubular casing 20 is deformed to form an abutment wall to retain the first blocking member 22 therein. Accordingly, the first blocking member 22 is located adjacent the first open end 30 with the annular abutment flange 44 of the first blocking member 22 contacting the end wall of the first open end 30 of the tubular casing 20.

Next, the coil spring 26 is inserted into the tubular casing 20 through the second open end 32 of the tubular casing 20 so that an end portion of the coil spring 26 surrounds the threads of second section 42 of the first blocking member 22. Now, the second blocking member 24 is press-fitted into the second open end 32 of the tubular casing 20 so that the second cylindrical section 62 of the second blocking member 24 is inserted into the other end portion of the coil spring 26. Alternatively, the second blocking member 24 is adhesively coupled within the second open end 32 of the tubular casing 20. In this position, one end of the biasing member 26 engages the second blocking member 24, while the other end of the biasing member 26 engages the adjusting nut or member 28 to normally hold the first blocking member 22 against the end wall of first open end 30. Thus, the coil spring 26 is under a compressed state between the first and second blocking members 22 and 24. Thus, the assembling of the braking power modulator 2 is completed.

Next, the magnitude of a pre-loaded force applied to the coil spring 26 of the braking power modulator 2 of the present invention will be described. The pre-loaded force represents a retraction force needed to be applied to the inner wire 10a of the brake cable 10 to actuate a movement of the inner wire guiding tube 10b toward the outer casing 10d of the brake cable 10, when a rider grips the brake lever (not shown) to pull the inner wire 10a for braking operation.

Due to differences in the riders' weight, experience, preferences, etc., the desired gripping power varies among various riders. Thus, the braking power modulator 2 of the present invention is adjustable to accommodate various riders' needs. The coil spring 26 of the braking power modulator 2 of the present invention is pre-loaded such that it has a low braking power force with a magnitude of approximately seven kilograms and a high braking power force with a magnitude of approximately fourteen kilograms. A rider can continuously adjust the braking power modulator 2 to suit his/her weight, hand's gripping power and custom of operating the brake. For example, a rider whose weight is sixty kilograms can suitably select a braking power modulator 2 having a pre-loaded force of ten kilograms. A rider whose weight is over sixty kilograms can suitably select a braking power modulator 2 having a pre-loaded force of fourteen kilograms. A rider whose weight is under sixty kilograms can select a modulator 2 having a pre-loaded force of seven kilograms. Of course, the braking power modulator 2 illustrated and discussed in this disclosure can be continuously adjusted from a low braking power force with a magnitude of approximately seven kilograms to the point in which the braking power modulator 2 is locked. When the braking power modulator 2 is locked, the inner ends of the first and second blocking members 22 and 24 abut each other so that the coil spring 26 can not be compressed during movement of the inner wire 10a.

When a rider grips the brake lever (not shown) to pull the inner wire 10a of the brake cable 10 for braking operation, a tension (retraction force) is produced on the inner wire 10a. When the tension is greater than the pre-loaded force (for example, seven, ten or fourteen kilograms) applied to the coil spring 26 of the braking power modulator 2, the inner wire guiding tube 10b is actuated to move the first blocking member 22. Thus, the adjusting member or nut 28 and the first blocking member 22 move together with the inner wire guiding tube 10b toward the outer casing 10d of the brake cable 10. Consequently, the adjusting member or nut 28 and the second blocking member 24 compress the coil spring 26 within the casing 20. Hence, a delay in the braking action can be achieved due to increased retraction stroke and retraction force of the inner wire 10a needed for the compression of the coil spring 26.

As seen in FIG. 9, a relationship between the braking force (kilograms) and the retraction or cable stroke (millimeters) of an inner wire 10a of a brake cable 10 is illustrated for explaining different braking powers produced with different pre-loaded forces applied to the coil spring 26. In FIG. 9, the vertical axis indicates the braking force (kilograms), while the horizontal axis indicates the retraction or cable stroke of the inner wire 10a of the brake cable 10.

The solid line in FIG. 9 that extends from the horizontal axis to the word LOCK represents braking power curves of a cantilever type of brake device without the braking power modulator 2 of the present invention. Each of the inclined solid lines in FIG. 9 that are parallel to each other and extend from the braking power curve without modulation represents a braking power curve of the cantilever type brake device with the braking power modulator 2 of the present invention mounted thereon. These five solid parallel lines of the braking power curves represent different pre-loaded forces being applied to the coil spring 26. In other words, these portions of the braking power curves represent the portion of the braking power curves that correspond to the compression of the coil spring 26. The length of the modulator stroke M is the same for each of the braking power curves. In other words, the length of the modulator stroke M does not change when the pre-loaded force applied to the coil spring 26 is changed. Preferably, the length of the modulator stroke M of the braking power modulator 2 is approximately seven millimeters.

As seen form FIG. 9, it is apparent that a general brake device without the braking power modulator 2 of the present invention has a steep braking power curve. That is, a large braking force can be obtained with a short retraction stroke of the inner wire 10a. In contrast, as shown in FIG. 9, after the braking power modulator 2 of the present application is mounted on the same brake device, braking power curves showing buffering effects are obtained. That is, the bicycle brake device 1 is now easier for the inexperienced rider to control.

If the coil spring 26 of braking power modulator 2 is pre-loaded with a force of approximately seven kilograms, the braking force is rapidly increased at an initial braking stage, but then when the coil spring 26 begins to compress, the braking force is gradually increased at a slower rate. Once the inner ends of the first and second blocking members 22 and 24 contact each other, the coil spring 26 can no longer be compressed. Thus, the rate of the braking force begins to rapidly increase again at the final stage of the cable stroke. If the coil spring 26 of braking power modulator 2 is pre-loaded with a higher force, the braking power modulator 2 will not take effect as soon in the cable stroke. In other words, the initial braking stage will be longer such that a greater braking force can be applied to the rim before the braking power modulator 2 takes effect to decrease the rate of the braking force in relation to the cable stroke.

It is apparent from these braking power curves that with the braking power modulator 2 of the present invention, the retraction stroke of the inner wire 10a of the brake cable 10 between the start of the braking operation and the complete stop of the wheel due to the lock of the rim by the brake shoes includes a modulator stroke, which prevents an overly early lock of the rim by the brake shoes. During the buffering stroke, a rider still obtains a braking effect and hence a good brake control feeling. The rider can comfortably carry out the brake control without having to depend on professional control skills and thus can enjoy the ride. The overly early lock of the rim of the wheel by the brake shoes and the failure of the brake control are effectively prevented, especially in a downhill ride.

SECOND EMBODIMENT

Referring now to FIGS. 10–13, a modified braking power modulator 2' is illustrated in accordance with another embodiment of the present invention. This embodiment is substantially identical to the first embodiment discussed above, except that a transparent cover 38' has been added and the bottom end of tubular casing 20' has been modified in this embodiment. In view of the similarities between this embodiment and the prior embodiment, the braking power modulator 2' will not be discussed or illustrated in as much detail herein. Moreover, the reference numerals of the first embodiment will be utilized in this embodiment for identical parts. The modified parts of this embodiment will be identified with a prime (').

Figure 10:
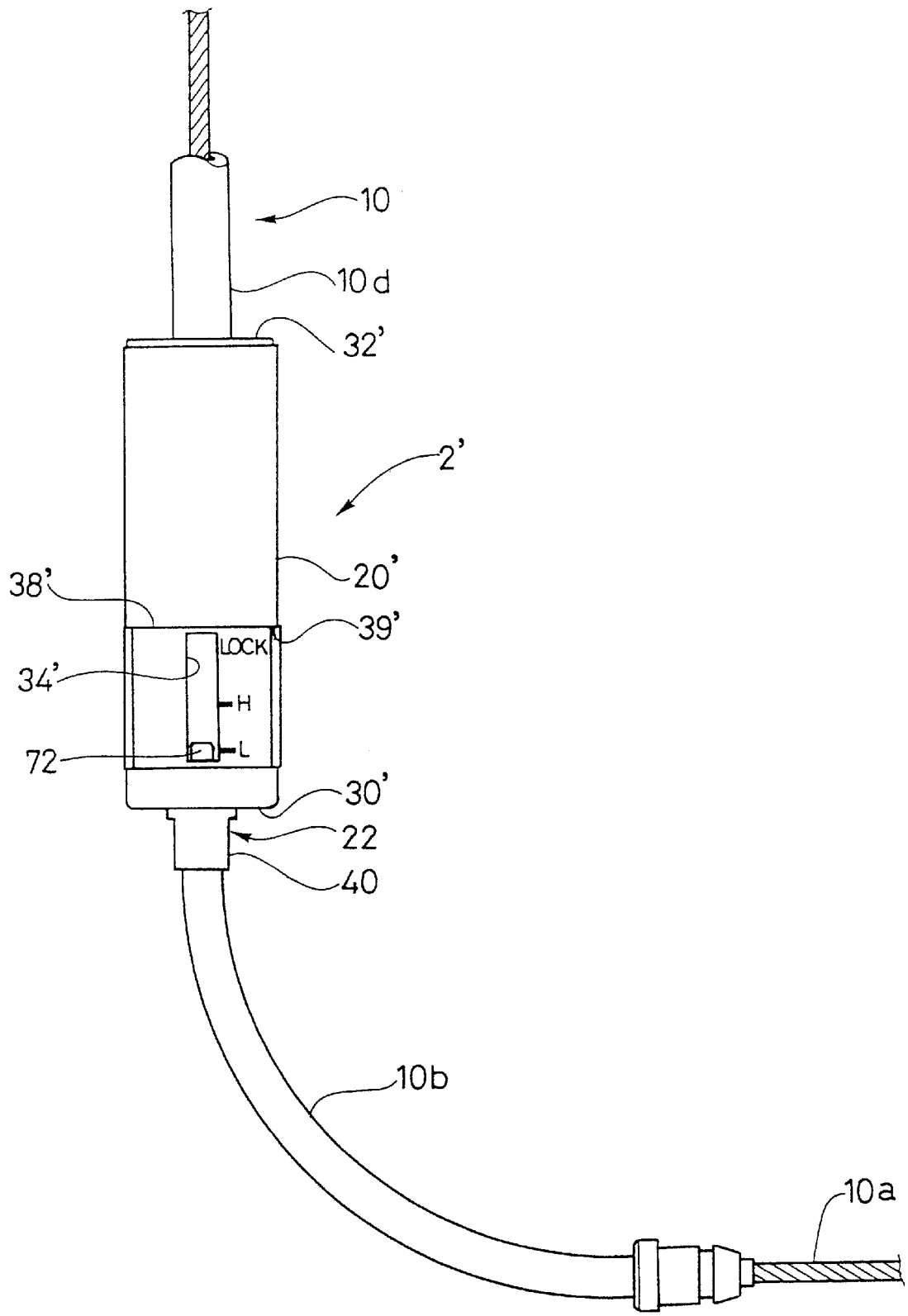
FIG. 10 is an enlarged front elevational view of a braking power modulator in accordance with another embodiment of the present invention.

As shown in FIGS. 10 and 11, the braking power modulator 2' is mounted midway along the brake cable 10 for the bicycle brake device 1 shown in FIG. 1. The braking power modulator 2' is adjustable to provide different braking powers for different riders or different road conditions. Once the shoe clearance is fixed, the overall cable stroke for the brake device 1 is also fixed regardless of the setting of the braking power modulator 2'.

As shown in FIG. 11, the braking power modulator 2' is similar to the first embodiment, and basically includes a modified outer tubular casing or portion 20', first blocking member or portion 22, second blocking member or portion 24, biasing member 26 and adjusting nut or member 28. The outer tubular casing or portion 20' is constructed of three parts for easily assembling the braking power modulator 2' and for preventing contaminants from entering into the braking power modulator 2'.

Braking power modulator 2' is designed so that the overall cable stroke does not change when the braking power modulator 2' is adjusted. This is accomplished by providing a constant modulator stroke M between the first and second blocking members 22 and 24, as seen in FIG. 11. Preferably, modulator stroke M is approximately seven millimeters of the overall cable stroke. By adjusting braking power modulator 2', the modulator stroke M is shifted along the braking power curve as seen in FIG. 9.

The tubular casing 20' has a first open end 30' and a second open end 32' with a longitudinal axis extending therebetween. The size of the opening of first open end 30' is reduced by an end cap or member 36' that is fixedly secured to the tubular casing 20' by adhesive, a press-fit or any other fastening method. In the preferred embodiment, tubular casing 20' is a hollow cylindrical body made of aluminum or hard resin. The first blocking member 22 with the adjusting member 28 coupled thereto is movably disposed within outer tubular casing 20' adjacent the first open end 30'. The second blocking member 24 is fixedly disposed within outer tubular casing 20' adjacent the second open end 32'. The biasing member 26 is movably disposed within outer tubular casing 20' between the second blocking member 24 and the adjusting nut or member 28. In order to have a smooth movement of the first blocking member 22 and a smooth expansion and compression of the coil spring 26 in the casing 20', the interior of the casing 20' is preferably coated with a lubricating oil (not shown).

The side wall of tubular casing 20' is provided with a pair of elongated windows or openings 34' for viewing the setting of braking power modulator 2'. A transparent tubular sleeve or cover 38' overlies openings 34' to prevent contaminants from entering the tubular casing 20'. Preferably, the cover 38' is located in an annular recess 39' that is formed on the outer surface of the casing 20'. Thus, the cover 38' forms a transparent section of the casing 20'. Indicia can be provided on the transparent cover 38' or the side wall of tubular casing 20' to indicate the setting of braking power modulator 2'. In the illustrated embodiment, three settings are provided on the transparent cover 38' or the tubular casing 20', e.g., L (low) and H (high) and LOCK. Of course, other types of indicia can be used, such as a scale with kilograms.

As seen in FIGS. 12 and 13, a tool or hand-operated adapter 41 is illustrated for turning first blocking member or portion 22 relative to the adjusting nut or member 28. More specifically, hand-operated adapter 41 has a slot 43 that is adapted to receive the first section 40 of the first blocking member or portion 22. More specifically, the opposite flat sides of slot 43 of hand-operated adapter 41 engages the oppositely facing flat portions of first section 40 of the first blocking member or portion 22. Accordingly, rotation of the first blocking member or portion 22 by the hand-operated adapter 41 results in the adjusting member or nut 28 to move axially within the interior of housing 20' to compress spring 26. While hand-operated adapter 41 is illustrated as being used with braking power modulator 2', it will be apparent to those skilled in the art from this disclosure that hand-operated adapter 41 can also be utilized with the braking power modulator 2 of the first embodiment.

THIRD EMBODIMENT

Figure 14:
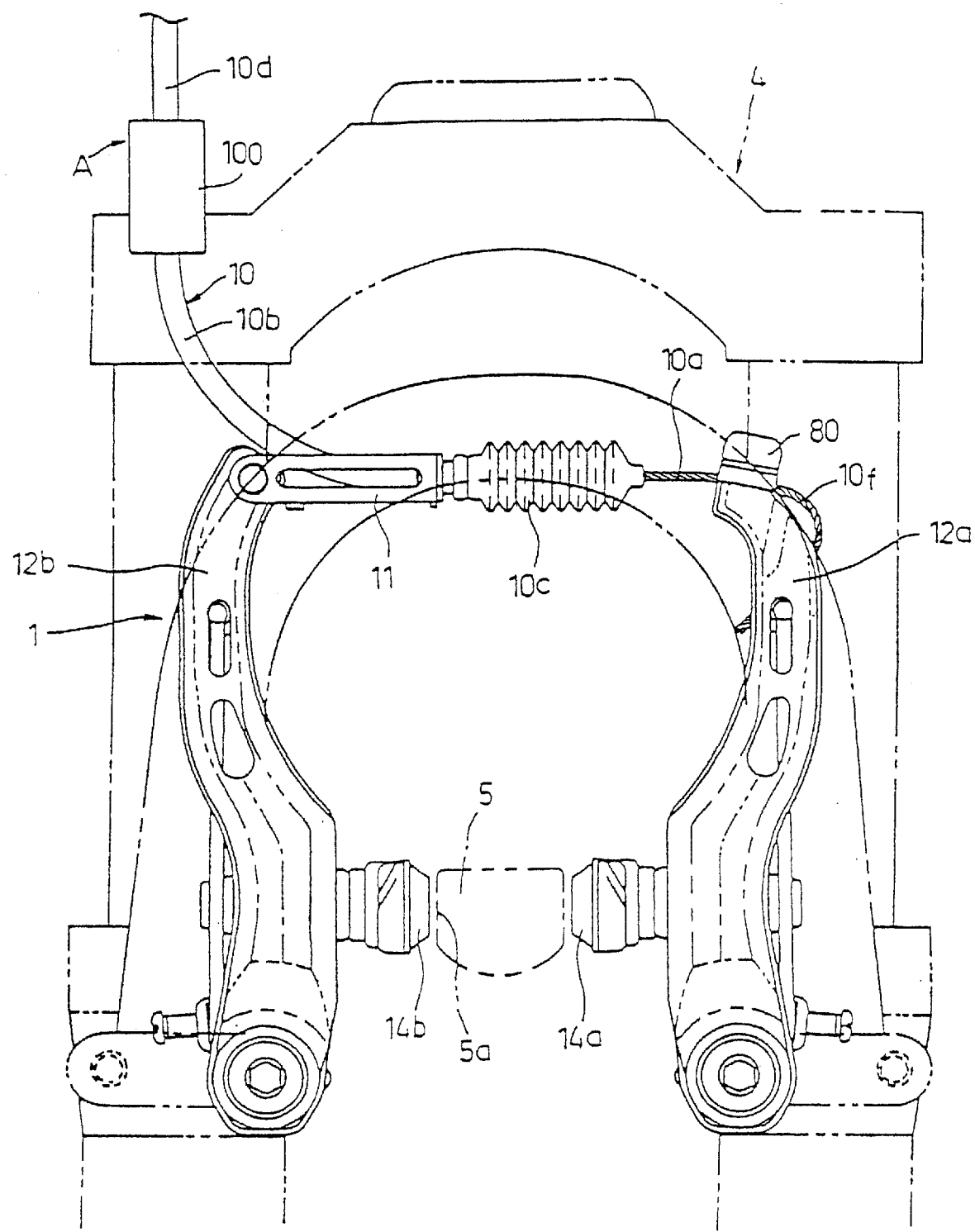
FIG. 14 is a front elevational view of a bicycle brake device having a braking power modulator in accordance with another embodiment of the present invention.

Referring now to FIGS. 14–18, a non-adjustable braking power modulator 100 is illustrated in accordance with another embodiment of the present invention. This embodiment of the present invention will now be described below with reference to the drawings. FIG. 14 shows an example of a general bicycle brake device 1 having a braking power modulator 100 according to the present invention. The bicycle brake device 1 shown in FIG. 14 is a cantilever type brake device and achieves a braking effect by pressing brake shoes 14a and 14b against side surfaces 5a of a rim 5 of a bicycle wheel.

Brake arms 12a and 12b of the brake device 1 are pivotally supported on a front fork 4 of a bicycle frame. The brake arm 12a of the brake device 1 is connected at an upper end thereof with a front end 10f of an inner wire 10a of a brake cable 10 through a screw 80. The rear end of the inner wire 10a is connected to a brake lever (not shown) provided on a handlebar (not shown). The brake arm 12b of the brake device 1 is provided at an upper end thereof with a connecting arm 11 which pivots about the upper end of the brake arm 12b. A guiding tube 10b for the inner wire 10a of the brake cable 10 is retained at a front end thereof in the connecting arm 11. A telescopic protecting sheath 10c is mounted around the inner wire 10a and disposed adjacent to the connecting arm 11.

As shown in FIG. 14, a rear end of the inner wire guiding tube 10b is inserted into an end of the braking power modulator 100 of the present invention. An outer casing 10d of the brake cable 10 is inserted at a lower end thereof into the other end of the braking power modulator 100 and is connected at the other end thereof to the brake lever (not shown). The brake cable 10 of brake device 1 without the braking power modulator 100 is currently available on the market.

To use the braking power modulator 100 of the present invention, it is only necessary to mount the braking power modulator 100 between the lower end of the outer casing 10d of the brake cable 10 and the inner wire guiding tube 10b. In this way, the lower end of the outer casing 10d is inserted into one end of the braking power modulator 100 and the upper end of the inner wire guiding tube 10b is inserted into the other end of the modulator 100. The rear end (not shown) of the inner wire 10a is fixed to an inner wire end mounting portion of the brake lever (not shown). The front end 10f of the inner wire 10a sequentially passes through the outer casing, 10d, the braking power modulator 100, the inner wire guiding tube 10b and the telescopic protecting sheath 10c and then is fixed to the upper end of the brake arm 12a through the screw 80.

Figure 15:
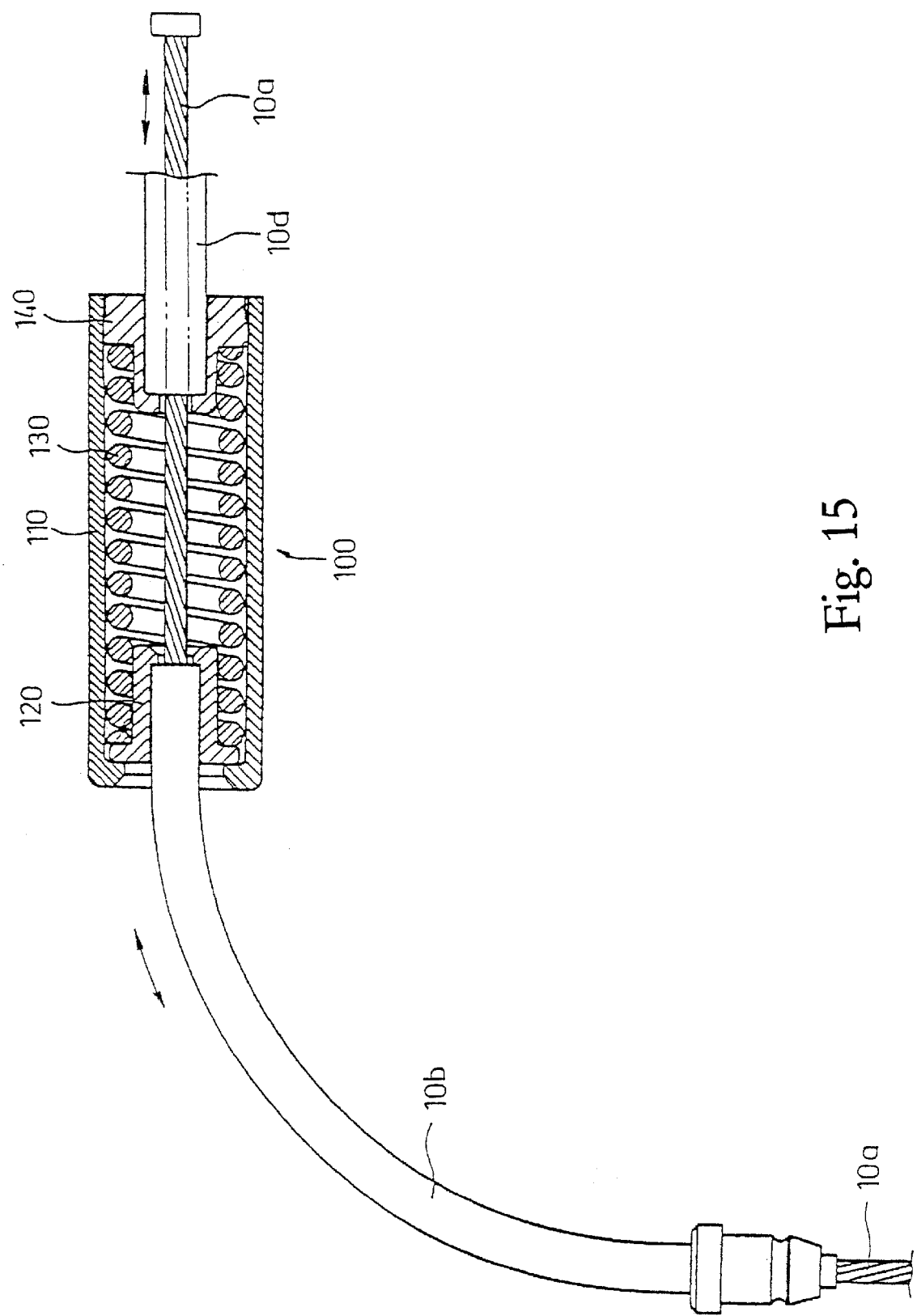
FIG. 15 is a longitudinal cross-sectional view showing the braking power modulator illustrated in FIG. 14 after being mounted between an outer casing and an inner wire guiding tube of a brake cable.
Figure 16:
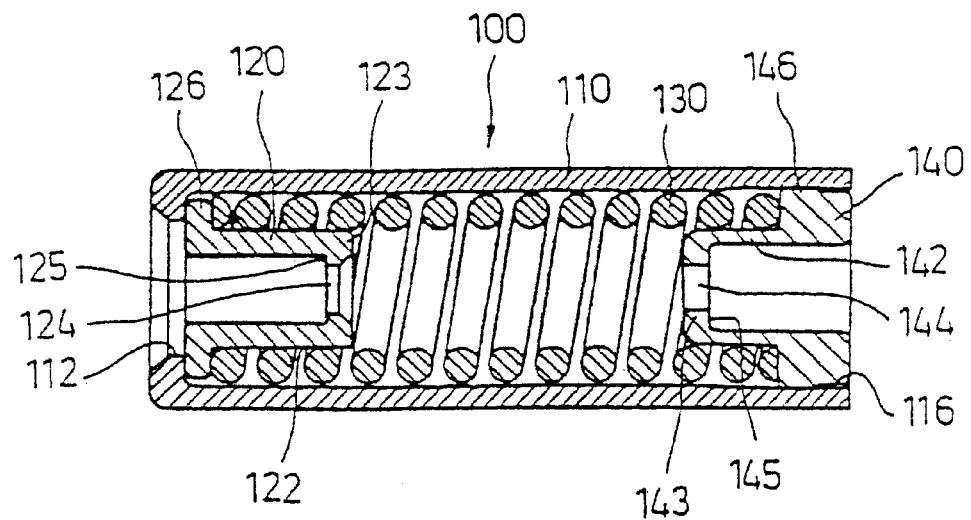
FIG. 16 is a longitudinal section view showing a detailed structure of the braking power modulator illustrated in FIGS. 14 and 15.

As shown in FIGS. 15 and 16, the braking power modulator 100 of the present invention comprises a housing 110, a first blocking member 120, a coil spring 130 and a second blocking member 140. The housing 110 is a hollow cylindrical body made of aluminum or hard resin, and has at one end thereof a first circular opening 112 and at the other end thereof a second circular opening 116.

The first blocking member 120 is a hollow cylindrical body made of resin, and has a cylindrical portion 122 with an end wall 123 at a front end side thereof (right side in FIG. 16), a third circular opening 124 formed in a central portion of the end wall 123 and having a diameter slightly greater than an outer diameter of the inner wire 10a and a first annular abutment 125 formed in the cylindrical portion 122 for abutting an end of the outer casing 10d of the brake cable 10 or an end of the inner wire guiding tube 10b. Also, the cylindrical portion 122 of the first blocking member 120 is provided at a rear end side thereof (left side in FIG. 16) with an annular flange 126. The annular flange 126 has an outer diameter slightly smaller than an inner diameter of the housing 110 and greater than an inner diameter of the first opening 112 of the housing 110. The first blocking member 120 is movably disposed adjacent to the first opening 112 within the housing 110 and is prevented from falling out of the housing 110 from the first opening 112 due to the fact that the outer diameter of the flange 126 is greater than the inner diameter of the first opening 112.

The coil spring 130 is made of steel and has an outer diameter slightly smaller than the inner diameter of the housing 110 and an inner diameter equal to or slightly greater than an outer diameter of the cylindrical portion 122 of the first blocking member 120 and an outer diameter of a cylindrical portion 142 of the second blocking member 140 described later. The coil spring 130 is disposed in the housing 110 with an end portion thereof surrounding the cylindrical portion 122 of the first blocking member 120 and abutting against the annular flange 126 of the first blocking member 120.

Similar to the first blocking member 120, the second blocking member 140 is a hollow cylindrical body made of resin, and has a cylindrical portion 142 with an end wall 143 at a front end side thereof (left side in FIG. 16), a fourth circular opening 144 formed in a central portion of the end wall 143 and having a diameter slightly greater than the outer diameter of the inner wire 10a and a second annular abutment 145 formed in the cylindrical portion 142 for abutting an end of the outer casing 10d of the brake cable 10 or an end of the inner wire guiding tube 10b. Also, the cylindrical portion 142 of the second blocking member 140 is provided at a rear end side thereof (right side in FIG. 16) with an annular flange 146. The annular flange 146 has an outer diameter equal to or slightly smaller than the inner diameter of the housing 110. The second blocking member 140 is press-fitted and fixed in the second opening 116 of the housing 110.

When the braking power modulator 100 as described above is assembled, the first blocking member 120 is first disposed adjacent to the first opening 112 within the housing 110, and then the coil spring 130 is inserted into the housing 110 so that an end portion of the coil spring 130 surrounds the cylindrical portion 122 of the first blocking member 120. Under this state, the second blocking member 140 is pressed into the housing 110 from the second opening 116 of the housing 110 so that the cylindrical portion 142 of the second blocking member 140 is inserted into the other end portion of the coil spring 130 which is thus abuts against the annular flange 146 of the second blocking member 140. Thus, the coil spring 130 is under a compressed state by being pressed from the two end portions thereof by the annular flange 126 of the first blocking member 120 and the annular flange 146 of the second blocking member 140, respectively. Under this state, clamping working is performed on an outer peripheral surface of the housing 110 near the second opening 116 so that the second blocking member 140 is integrally fixed to the housing 110 in the second opening 116. Alternatively, the housing 110 can be modified to be similar in construction to the housing 20' as illustrated in FIG. 11. In other words, the first blocking member 120 can be retained within the housing 110 by press-fitting an end cap or washer such as end cap or member 36' of the prior embodiment. Thus, the assembling of the braking power modulator 100 is completed.

Of course, in order to have a smooth movement of the first blocking member 120 and a smooth expansion and compression of the coil spring 130 in the housing 110, the interior of the housing 110 can be coated with a lubricating oil (not shown).

Figure 17:
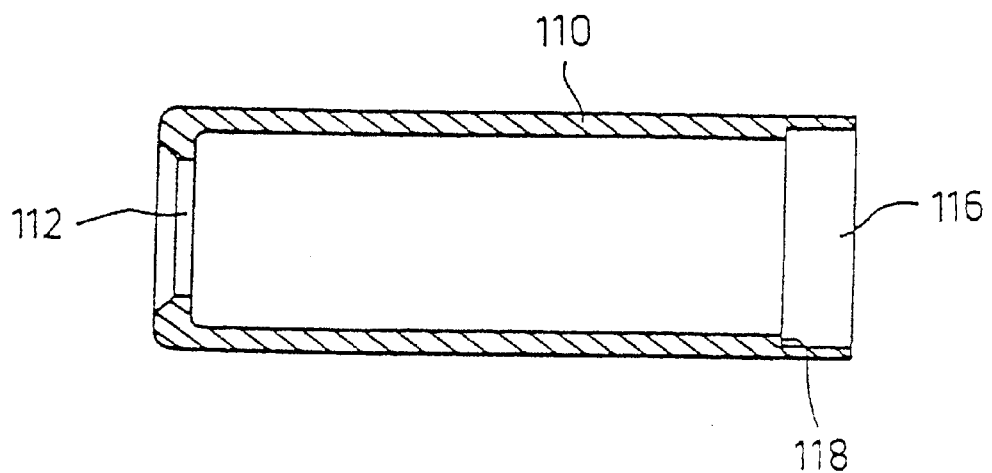
FIG. 17 is a longitudinal sectional view showing another structure of a housing for the braking power modulator illustrated in FIGS. 14–16.

In addition, as shown in FIG. 17, an annular recess 118 may be formed inside the housing 110 near the second opening 116 to retain the annular flange 146 of the second blocking member 140 when the second blocking member 140 is pressed into the second opening 116. This arrangement facilitates the positioning of the second blocking member 140 and prevents it from easy movement.

Although in the above, clamping working is performed to cause the second blocking member 140 to be integrally fixed to the housing 110 in the second opening 116, the present invention is not limited thereto. The second blocking member 140 can be fixed in the second opening 116 with an adhesive.

Next, the magnitude of a pre-loaded force applied to the coil spring 130 of the braking power modulator 100 of the present invention will be described. Herein, the pre-loaded force represents a traction force needed to be applied to the inner wire 10a of the brake cable 10 in order to actuate a movement of the inner wire guiding tube 10b toward the outer casing 10d of the brake cable 10 when a rider grips the brake lever (not shown) to pull the inner wire 10a for braking operation.

Due to differences in the weight, the gripping power and the custom of operating the brake among various riders, the coil spring 130 of the braking power modulator 100 of the present invention is pre-loaded with a force having a magnitude in the range of, for example, seven to thirteen kilograms. A rider can purchase a suitable braking power modulator 100 based on his/her weight, hand's gripping power and custom of operating the brake. For example, a rider whose weight is sixty kilograms can suitably select a braking power modulator 100 having a pre-loaded force of ten kilograms, and a rider whose weight is over sixty kilograms can suitably select a braking power modulator 100 having a pre-loaded force of thirteen kilograms while a rider whose weight is under sixty kilograms can select a modulator 100 having a pre-loaded force of seven kilograms.

When a rider grips the brake lever (not shown) to pull the inner wire 10a of the brake cable 10 for braking operation, a tension (traction force) is produced on the inner wire 10a. When the tension is greater than the pre-loaded force (for example, seven, ten or thirteen kilograms) applied to the coil spring 130 of the braking power modulator 100, the inner wire guiding tube 10b is actuated to move under the state that the upper end thereof abuts against the first abutment 125 of the first blocking member 120. Thus, the first blocking member 120 is caused to move together with the inner wire guiding tube 10b toward the outer casing 10d of the brake cable 10. Consequently, the coil spring 130 in the housing 110 is compressed by the annular flange 126 of the first blocking member 120. Hence, a delay in the braking action can be achieved due to increased traction stroke and traction force of the inner wire 10a needed for the compression of the coil spring 130.

Figure 18:
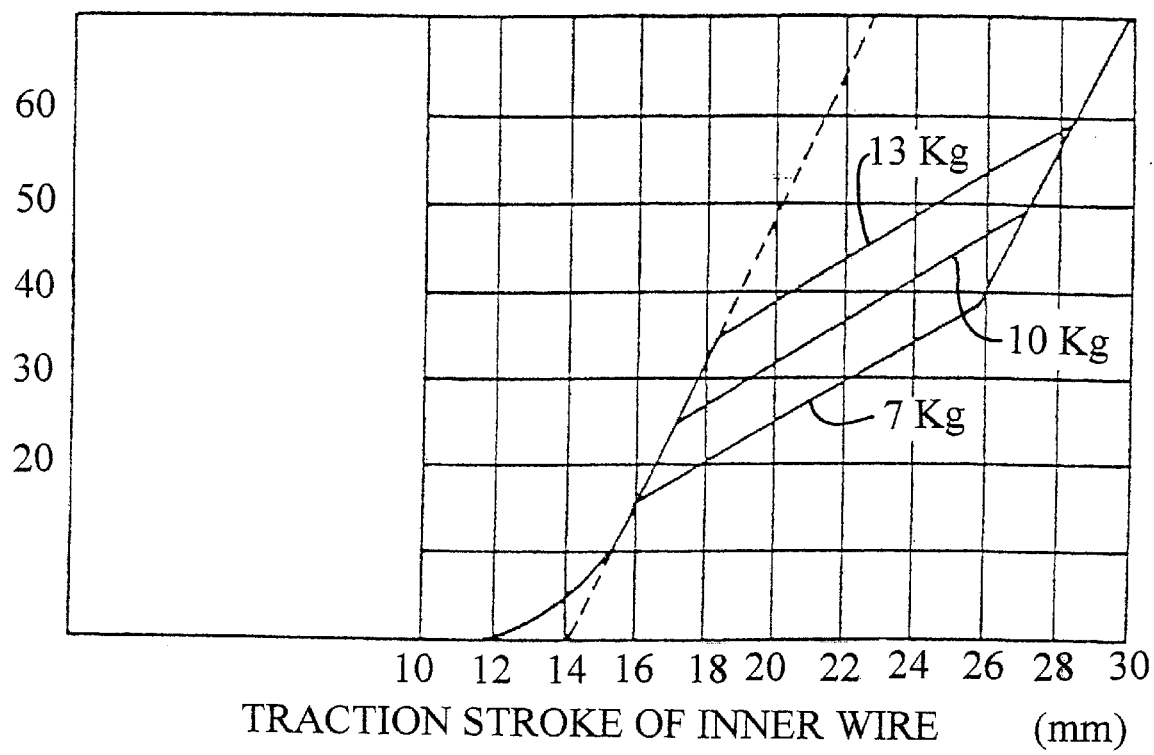
FIG. 18 is a graph of braking power curves representing a relationship between a braking force and a traction stroke of the inner wire of the brake cable for the braking power modulator illustrated in FIGS. 14–16.

FIG. 18 shows a relationship between the braking force (kilograms) and the traction stroke (millimeters) of an inner wire of a brake cable, for explaining different braking powers produced with different pre-loaded forces applied to the coil spring 130.

In FIG. 18, the axis of ordinate indicates the braking force (kilograms) and the axis of abscissa indicates the traction stroke of the inner wire of the brake cable. The broken line in FIG. 18 represents a braking power curve of a general cantilever type brake device without the braking power modulator 100 of the present invention, and each of the inclined solid lines in FIG. 18 represents a braking power curve of the general cantilever type brake device with the braking power modulator 100 of the present invention having been mounted thereon. The three solid curves from the bottom to the top represent braking power curves in cases of the pre-loaded forces applied to the coil spring 130 being seven, ten and thirteen kilograms, respectively.

From the broken line in FIG. 18, it is apparent that a general brake device without the braking power modulator

100 of the present invention has a steep braking power curve. That is, starting from a traction stroke of fourteen millimeters, a large braking force can be obtained with a short traction stroke of the inner wire. In contrast, as shown by the solid lines in FIG. 18, after the braking power modulator 100 of the present application is mounted on the same brake device, braking power curves showing buffering effects are obtained. That is, the bicycle brake device 1 is now easier for the inexperienced rider to control.

More specifically, if a braking power modulator 100 having a pre-loaded force of seven kilograms is used, the braking force is rapidly increased at an initiate stage having a traction stroke of twelve to sixteen millimeters. At an intermediate stage having a traction stroke of sixteen to about twenty-six millimeters, however, the braking force is gradually increased. The braking force is rapidly increased again at the final stage after the traction stroke is beyond twenty-six millimeters.

If a braking power modulator 100 having a pre-loaded force of ten kilograms is used, the braking force is rapidly increased at an initiate stage having a traction stroke of twelve to seventeen millimeters. At an intermediate stage having a traction stroke of seventeen to about twenty-seven millimeters, however, the braking force is gradually increased. The braking force is rapidly increased again at the final stage after the traction stroke is beyond twenty-seven millimeters.

If a braking power modulator 100 having a pre-loaded force of thirteen kilograms is used, the braking force is rapidly increased at an initiate stage having a traction stroke of twelve to about eighteen millimeters. At an intermediate stage having a traction stroke of eighteen to about twenty-eight millimeters, however, the braking force is gradually increased. The braking force is rapidly increased again at the final stage after the traction stroke is beyond twenty-eight millimeters.

It is apparent from these braking power curves that with the braking power modulator 100 of the present invention additionally mounted, the traction stroke of the inner wire of the brake cable between the start of the braking operation and the complete stop of the wheel due to the lock of the rim by the brake shoes includes a sufficiently long section of buffering stroke which prevents the overly early lock of the rim by the brake shoes. During the buffering stroke, a rider still obtains a braking effect and hence a good brake control feeling. The rider can comfortably carry out the brake control without having to depend on professional control skills and thus can enjoy the ride. The overly early lock of the rim of the wheel by the brake shoes and hence the failure of the brake control are effectively prevented, especially in a downhill ride.

According to the braking power modulator for a bicycle brake of the present invention, since the structure dimensions thereof correspond to the sizes of an outer casing and an inner wire guiding tube of a brake cable for a general brake device currently available on the market and the volume thereof is small, the braking power modulator can be mounted midway along the brake cable of any type of bicycle brake as desired and hence has a considerable general applicability.

Also, since the coil spring, the first blocking member and the second blocking member are all enclosed within the housing, the braking power modulator has a simplified structure, a high reliability and a low manufacturing cost and hence a great generality.

Furthermore, different pre-loaded forces, such as seven, ten and thirteen kilograms, applied to the coil spring are available for selection. A rider can select a braking power modulator having a suitable pre-loaded force based on his/her weight, hand's gripping power and custom of operating the brake. Thus, the rider can obtain a good brake control feeling, and can comfortably carry out the brake control without having to depend on professional control skills and thus can enjoy the ride. The overly early lock of the rim of the wheel by the brake shoes and hence the failure of the brake control are effectively prevented, especially in a downhill ride.

While only three main embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A braking power modulator for a bicycle disposed midway along a brake cable for modulating a braking power corresponding to a stroke of an inner wire of the brake cable, said braking power modulator comprising:

a tubular portion having a first end and a second end with a longitudinal axis extending therebetween;

a first blocking portion with a first cable bore movably coupled to said first end of said tubular portion for axial movement within said tubular portion along a predetermined modulator stroke;

a second blocking portion with a second cable bore coupled to said second end of said tubular portion;

a biasing member disposed in said tubular portion between said first and second blocking portions under a pre-loaded state with a pre-set compression force; and an adjusting member engaging said biasing member to change said pre-set compression force of said biasing member without changing said predetermined modulator stroke of said first blocking portion.

2. A braking power modulator according to claim 1, wherein
   said second blocking portion is a separate member that is press-fitted into a second end of said tubular portion.

3. A braking power modulator according to claim 1, wherein
   said second blocking portion is a separate member that is fixed to said tubular portion with an adhesive.

4. A braking power modulator according to claim 1, wherein
   said adjusting member includes a nut that is threadedly coupled to one of said first and second blocking portions.

5. A braking power modulator according to claim 4, wherein
   said nut is threadedly coupled to said first blocking portion.

6. A braking power modulator according to claim 1, wherein
   said adjusting member is adjustably coupled to said first blocking portion for movement therewith.

7. A braking power modulator according to claim 1, wherein
   said tubular portion includes a window for viewing relative positioning of said adjusting member within said tubular portion.

8. A braking power modulator according to claim 1, wherein
said pre-set compression force of said biasing member is between approximately seven to fourteen kilograms.

9. A braking power modulator according to claim 1, wherein
said adjusting member is continuously adjustable to change said pre-set compression force of said biasing member between a low spring force position and a high spring force position.

10. A braking power modulator according to claim 9, wherein
said pre-set compression force of said biasing member applies a force of approximately seven kilograms at said low spring force.

11. A braking power modulator according to claim 10, wherein
said pre-set compression force of said biasing member applies a force of approximately fourteen kilograms at said high spring force.

12. A braking power modulator according to claim 9, wherein
said pre-set compression force of said biasing member applies a force of approximately fourteen kilograms at said high spring force.

13. A braking power modulator according to claim 9, wherein
said adjusting member is adjustable to compress said biasing member to a locking position in which said first blocking portion is effectively non-movable.

14. A braking power modulator according to claim 1, wherein
said adjusting member is adjustable to compress said biasing member to a locking position in which said first blocking portion is effectively non-movable.

15. A braking power modulator according to claim 1, wherein
said second cable bore of said second blocking portion has a first cylindrical portion with a diameter slightly greater than an outer diameter of a second outer casing member of the brake cable, a second cylindrical portion with a diameter slightly greater than an outer diameter of the inner wire of the brake cable, and an abutment formed between said first and second cylindrical portions of said second cable bore of said second blocking portion for abutting an end of the second outer casing member of the brake cable.

16. A braking power modulator according to claim 1, wherein
said first cable bore of said first blocking portion has a first cylindrical portion with a diameter slightly greater than an outer diameter of a first outer casing member of the brake cable, a second cylindrical portion with a diameter slightly greater than an outer diameter of the inner wire of the brake cable, and an abutment formed between said first and second cylindrical portions of said first cable bore of said first blocking portion for abutting an end of the first outer casing member of the brake cable.

17. A braking power modulator according to claim 16, wherein
said second cable bore of said second blocking portion has a first cylindrical portion with a diameter slightly greater than an outer diameter of a second outer casing member of the brake cable, a second cylindrical portion with a diameter slightly greater than an outer diameter of the inner wire of the brake cable, and an abutment formed between said first and second cylindrical portions of said second cable bore of said second blocking portion for abutting an end of the second outer casing member of the brake cable.

18. A braking power modulator according to claim 1, wherein
said first blocking portion includes an outer adjustment portion extending from an opening formed in said first end of said tubular portion.

19. A braking power modulator according to claim 18, wherein
said first blocking portion includes an annular flange having an outer diameter that is smaller than an inner diameter of said tubular portion, but larger than said opening of said first end of said tubular portion.

20. A braking power modulator according to claim 19, wherein
said first blocking portion includes an inner portion with said adjusting member movably coupled thereto.

21. A braking power modulator according to claim 18, wherein
said tubular portion includes a window for viewing relative positioning of said adjusting member within said tubular portion.

22. A braking power modulator according to claim 21, wherein
said adjusting member has at least one tab engaging said window to prevent relative rotational movement between said tubular portion and said adjusting member.

23. A braking power modulator according to claim 1, wherein
said tubular portion is made of aluminum.

24. A braking power modulator according to claim 1, wherein
said tubular portion is made of resin.

25. A braking power modulator according to claim 24, wherein
said tubular portion includes a transparent section.

26. A braking power modulator according to claim 1, wherein
said tubular portion includes indicia that represent settings of said pre-set compression force.

27. A braking power modulator according to claim 1, wherein
said biasing member is a coil spring.

28. A braking power modulator according to claim 1, further comprising
a cover overlying at least said tubular portion to prevent contamination.

29. A braking power modulator according to claim 28, wherein
said cover is made of resin.

30. A braking power modulator according to claim 28, wherein
said cover is transparent.

31. A braking power modulator according to claim 1, wherein
said tubular portion includes an end member with a hole formed therein, said end member being a separate member that is fixedly coupled to said first end of said tubular portion.

* * * * *